US008014360B2

(12) United States Patent
Kim et al.

(10) Patent No.: US 8,014,360 B2
(45) Date of Patent: Sep. 6, 2011

(54) APPARATUS AND METHOD FOR PERFORMING SEQUENTIAL SCHEDULING IN MULTIPLE-INPUT MULTIPLE-OUTPUT SYSTEM

(75) Inventors: Yu-Seok Kim, Seoul (KR); In-Soo Hwang, Yongin-si (KR); Jin-Gon Joung, Seoul (KR); Yong-Hoon Lee, Daejeon (KR); Kyung-Min Kim, Daejeon (KR); Yong-Up Jang, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 761 days.

(21) Appl. No.: 11/985,769

(22) Filed: Nov. 16, 2007

(65) Prior Publication Data

US 2008/0117815 A1 May 22, 2008

(30) Foreign Application Priority Data

Nov. 17, 2006 (KR) .................. 10-2006-0113823

(51) Int. Cl.
 H04W 4/00 (2009.01)
 H04J 3/00 (2006.01)
 H04B 7/212 (2006.01)
(52) U.S. Cl. .................. 370/332; 370/334; 370/337
(58) Field of Classification Search .............. 370/332, 370/334, 337
 See application file for complete search history.

(56) References Cited

U.S. PATENT DOCUMENTS

| 7,016,657 | B2 * | 3/2006 | Boariu .................. 455/102 |
| 7,463,601 | B2 | 12/2008 | Lee et al. |
| 7,599,698 | B2 * | 10/2009 | Cheng et al. .............. 455/452.2 |
| 2003/0128658 | A1 * | 7/2003 | Walton et al. ............... 370/208 |
| 2005/0169229 | A1 * | 8/2005 | Cho et al. .................. 370/344 |
| 2005/0243776 | A1 * | 11/2005 | Kawabata et al. ............ 370/337 |
| 2006/0039493 | A1 * | 2/2006 | Mukkavilli et al. ........... 375/267 |
| 2006/0146856 | A1 * | 7/2006 | Jung et al. .................. 370/431 |
| 2006/0148427 | A1 * | 7/2006 | Hamalainen et al. ......... 455/101 |
| 2006/0209764 | A1 * | 9/2006 | Kim et al. .................. 370/334 |
| 2007/0026810 | A1 * | 2/2007 | Love et al. ................ 455/67.11 |
| 2007/0058590 | A1 * | 3/2007 | Wang et al. ................ 370/334 |
| 2007/0097856 | A1 * | 5/2007 | Wang et al. ................ 370/210 |
| 2007/0149194 | A1 * | 6/2007 | Das et al. .................. 455/436 |
| 2007/0177555 | A1 * | 8/2007 | Brueck et al. .............. 370/338 |
| 2007/0183380 | A1 * | 8/2007 | Rensburg et al. ........... 370/338 |
| 2009/0190537 | A1 * | 7/2009 | Hwang et al. ............... 370/329 |
| 2009/0323851 | A1 * | 12/2009 | Ling et al. ................. 375/267 |

FOREIGN PATENT DOCUMENTS

| KR | 1020010112341 A | 12/2001 |
| KR | 1020050015730 A | 2/2005 |
| WO | WO 00/55986 A1 | 9/2000 |

* cited by examiner

*Primary Examiner* — Chi H Pham
*Assistant Examiner* — Farah Faroul

(57) ABSTRACT

An apparatus and method for performing sequential scheduling in a multiple-input, multiple-output (MIMO) system is provided. The method includes the steps of: selecting a user which reports the greatest partial feedback information among a plurality of pieces of partial feedback information of all users in an initialization operation, and requesting channel feedback information to the selected user; and broadcasting the channel feedback information of the selected user to remaining unselected users upon receiving the channel feedback information from the selected user. Accordingly, a maximum capacity can be obtained by using only selective channel feedback information without having to feed back channel state information of all users.

23 Claims, 6 Drawing Sheets

APPARATUS AND METHOD FOR PERFORMING SEQUENTIAL SCHEDULING IN MULTIPLE-INPUT MULTIPLE-OUTPUT SYSTEM

CROSS-REFERENCE TO RELATED APPLICATION(S) AND CLAIM OF PRIORITY

The present application claims the benefit under 35 U.S.C. §119(a) of Korean patent application filed in the Korean Intellectual Property Office on Nov. 17, 2006 and assigned Serial No. 2006-113823, the entire disclosure of which is hereby incorporated by reference.

TECHNICAL FIELD OF THE INVENTION

The present invention relates to an apparatus and method for performing sequential scheduling in a multiple-input, multiple-output (MIMO) system. More particularly, the present invention relates to a scheduling technique for minimizing the amount of channel feedback of a user and reducing a computational complexity in a transmitter or a receiver.

BACKGROUND OF THE INVENTION

Multiple-input, multiple-output (MIMO) schemes are being widely considered as means for increasing the channel capacity in wireless communication systems. In order to maximize the throughput of a multi-user (MU)-MIMO system, there is a need for an effective scheduling technique for selecting active users and the number of data streams for each user.

Conventionally, research on scheduling techniques in MU-MIMO systems have been mainly in association with methods of selecting active users from a plurality of users, methods of selecting the number of data streams for each user in a fixed active user group, and methods of performing scheduling in a condition where both the active user group and the number of data streams for each user are fixed. A transmitter of the system performs scheduling to achieve capacity maximization according to channel feedback information of each user. However, conventional research has drawbacks in that uplink resources are wasted since channel feedback is required for each user whenever scheduling is performed to select active users and the number of data streams for each user. In addition, computational complexity increases as a result of the scheduling.

In one conventional technique, a method based on a linear process that is easily implemented in practice is the Space Division Multiple Access (SDMA) technique. However, since an SDMA technique performs scheduling according to the channel feedback information of each user, the amount of feedback greatly increases when operating a system having a plurality of transmit (Tx) antennas. As a result, computational complexity increases in the transmitter or receiver. Therefore, it is difficult for an SDMA technique to be applied in a system having multiple Tx antennas.

Accordingly, there is a need for a scheduling technique for minimizing the amount of channel feedback of a user in a MU-MIMO system and a method of reducing a computational complexity in a transmitter or a receiver by using the scheduling technique.

SUMMARY OF THE INVENTION

To address the above-discussed deficiencies of the prior art, it is a primary aspect of the present invention to address at least the above-mentioned problems and/or disadvantages and to provide at least the advantages described below.

Accordingly, the present invention provides an apparatus and method for performing sequential scheduling in a multiple-input, multiple-output (MIMO) system.

One embodiment of the present invention provides a scheduling technique for minimizing the amount of channel feedback of a user in a MIMO system and reduces a computational complexity in a transmitter or a receiver using the scheduling technique.

Another embodiment of the present invention provides an apparatus and method for performing sequential scheduling by allowing a technique employed in a conventional transmitter to be used in a receiver, wherein the technique selects optimal active users and selects the number of data streams for each user in a MIMO system.

Another embodiment of the present invention provides an apparatus and method for performing sequential scheduling, whereby the amount of channel feedback is reduced by sequentially receiving only channel feedback information of selected users without having to allow a transmitter to feed back entire channel state information of all users in a MIMO system, and whereby a computational complexity resulted from combinations between users and the number of data streams for each user is reduced.

Another embodiment of the present invention provides an apparatus and method for reducing a computational complexity when a null-space is computed through a transmission or reception process in a MIMO system.

In one embodiment of the present invention, a method of performing scheduling in a transmitter of a communication system is provided. The method includes the steps of: selecting a user which reports the greatest partial feedback information among a plurality of pieces of partial feedback information of all users in an initialization operation, and requesting channel feedback information to the selected user; and broadcasting the channel feedback information of the selected user to remaining unselected users upon receiving the channel feedback information from the selected user.

In another embodiment of the present invention, a method of feeding back channel information in a receiver of a communication system is provided. The method includes the steps of: when channel feedback information is requested by a base station, transmitting the channel feedback information to the base station; and when channel feedback information of a previously scheduled user is received from the base station, computing partial feedback information by using channel state information of the receiver and the channel feedback information of the scheduled user.

In another embodiment of the present invention, an apparatus for performing scheduling in a transmitter of a communication system is provided. The apparatus includes: a scheduler for selecting a user which reports the greatest partial feedback information among a plurality of pieces of partial feedback information of all users in an initialization operation and requesting channel feedback information to the selected user, and for broadcasting the channel feedback information of the selected user to remaining unselected users upon receiving the channel feedback information from the selected user; and a feedback receiving unit for outputting, to the scheduler, partial feedback information received from unselected users and channel feedback information received from the selected user.

In still another embodiment of the present invention, an apparatus for feeding back channel information in a receiver of a communication system is provided. The apparatus includes a channel estimator for transmitting the channel feedback information to the base station when channel feedback information is requested by a base station, and for computing partial feedback information by using channel state information of the receiver and the channel feedback information of the scheduled user when channel feedback information of a previously scheduled user is received from the base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Hereinafter, a scheduling technique for minimizing the amount of channel feedback of a user and an apparatus and method for reducing a computational complexity in a transmitter or a receiver according to the scheduling technique will be described. The scheduling technique proposed in the present invention is a sequential scheduling method for selecting active users which can concurrently receive services among a plurality of users and for selecting the number of data streams for each active user.

Figure 1:
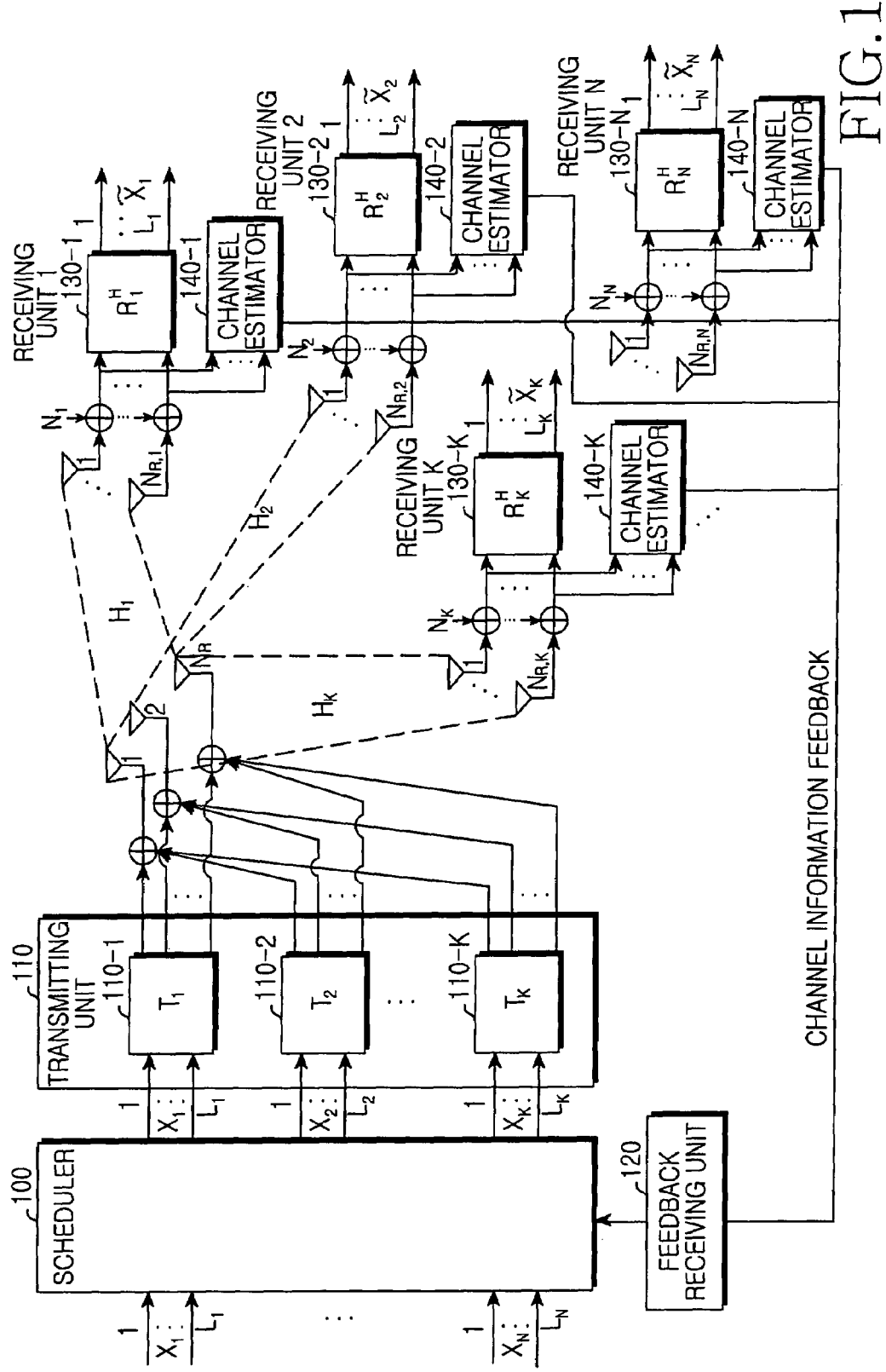
FIG. 1 is a block diagram illustrating a structure of a transmitter/receiver in a MU-MIMO system according to the present invention.

FIG. 1 is a block diagram illustrating a structure of a transmitter/receiver in a multi-user (MU) multiple-input, multiple-output (MIMO) system according to the present invention.

In the MU-MIMO system of FIG. 1, it is assumed that the number of all users is N, and the number of active users which can receive services from the system is K. The K active users selected from the N users can communicate using the same frequency. The number of transmit (Tx) antennas is $N_T$, and the number of receive (Rx) antennas of a kth user is $N_{R,k}$. A MIMO channel of each user is $H_k$, and a data stream of each user is $L_k$. A transmitter (i.e., base station) includes a scheduler 100, a transmitting unit 110, and a feedback receiving unit 120. A receiver (i.e., each user) includes receiving units 130-1 to 130-N and channel estimators 140-1 to 140-N.

Referring to FIG. 1, the scheduler 100 selects a user which reports the greatest partial feedback information value among a plurality of partial feedback information values input from the feedback receiving unit 120, and requests the selected user to send channel feedback information including entire feedback information (i.e., channel state information or CSI). The partial feedback information may be a signal-to-interference and noise ratio (SINR) or a capacity Ck (herein, k denotes a kth user) of each user, which can be used as a reference in scheduling. Thereafter, when the entire feedback information (i.e., CSI) and the number of data streams are received from the selected user as the channel feedback information, the scheduler 100 broadcasts the channel feedback information to remaining unselected users and receives partial feedback information which is newly computed by the remaining users. This process is repeated until scheduling is completed. Herein, the scheduling is completed when no partial feedback information is received from the remaining users or when the number of scheduled data streams is greater than or equal to the number of maximum available data streams.

The transmitting unit 110 provides K transmission processes 110-1 to 110-K, each of which performs pre-processing on the scheduled data streams. Thereafter, the transmitting unit 110 transmits the data streams to the respective users through corresponding antennas. The feedback receiving unit 120 outputs feedback information input from each receiving unit to the scheduler 100.

Each of the receiving units 130-1 to 130-N provides a reception process for performing post-processing. Transmit (Tx) data streams are restored through the reception processes.

The channel estimators 140-1 to 140-N estimate channels by using signals received through one or more receive (Rx) antennas, compute partial feedback information (e.g., SINR, capacity Ck, etc.) that can be used as a reference in scheduling by using the estimated channel state information, and transmit the partial feedback information to a base station. Thereafter, when channel state information on the scheduled user and the number of data streams are received from the base station, the channel estimators 140-1 to 140-N estimate a transmission and reception process for the case where the user is selected. The transmission and reception process is estimated by using the estimated channel state information, the received channel state information for the scheduled user, and the number of data streams. According to the estimated transmission and reception process, the channel estimators 140-1 to 140-N compute again partial feedback information (e.g., SINR or capacity Ck, etc.) that can be used as a reference in scheduling according to the number of data streams, and thereafter transmit the computed partial feedback information to the base station. If channel feedback information is requested from the base station, the channel estimators 140-1 to 140-N determine that the mobile station has been scheduled and then feed back to the base station the channel state information (CSI) of a mobile station and the number of data streams.

Figure 2A:
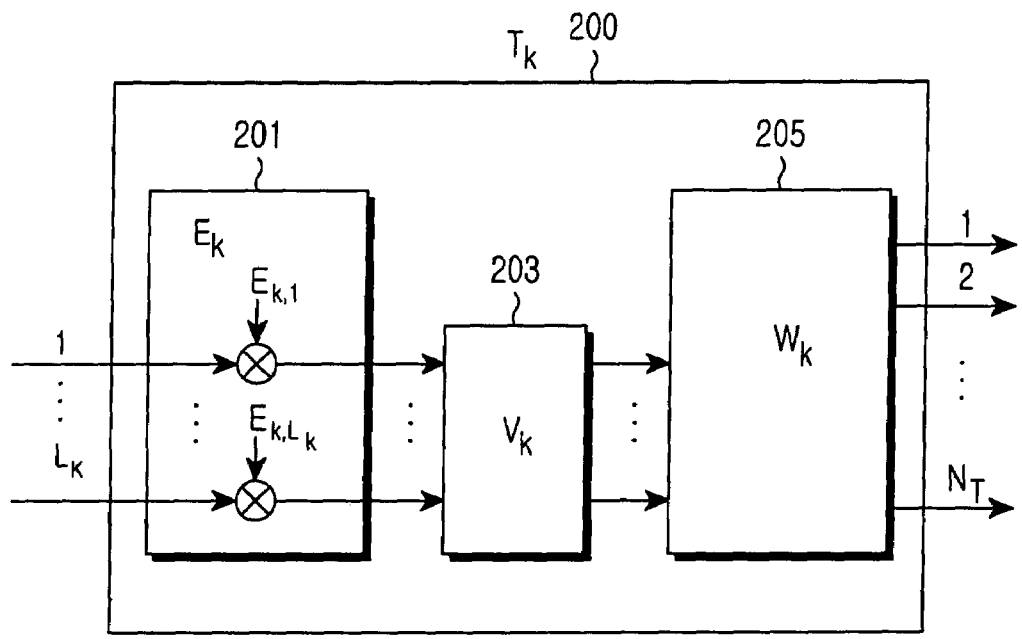
FIGS. 2A and 2B illustrate configurations of transmission/reception processes performed in a SDMA system according to the present invention.
Figure 2B:
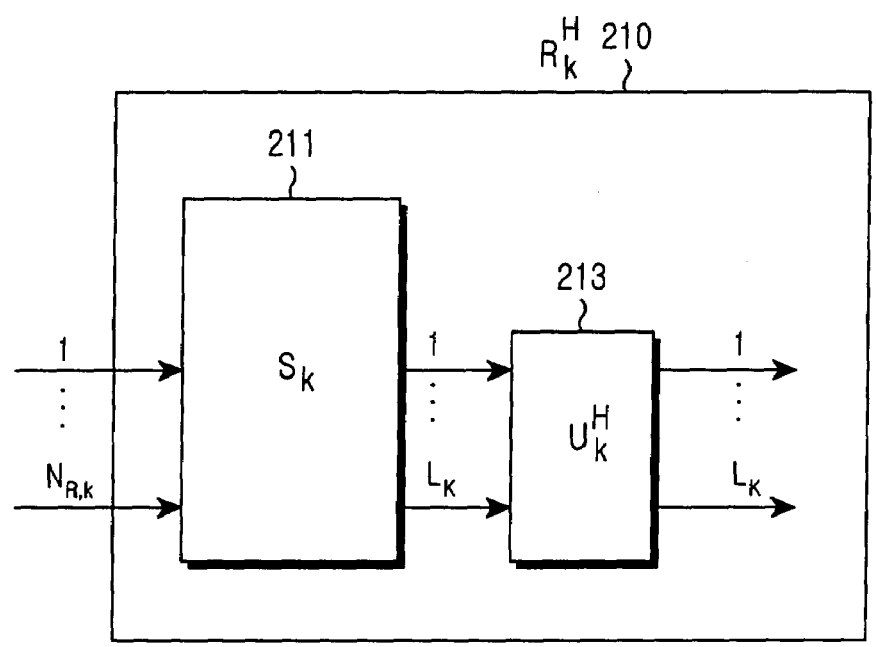

FIGS. 2A and 2B illustrate configurations of transmission and reception processes performed in a space division multiple access (SDMA) system according to the present invention.

Referring to FIG. 2A, a transmission process $T_k$ 200 of the SDMA system includes a water-filling power control weight $E_k$ 201, a Pre-Singular Value Decomposition (Pre-SVD) weight $V_k$ 203, and an SDMA weight $W_k$ 205. Referring to FIG. 2B, an $R_k^H$ 210 is a complex conjugate and transpose of a reception process $R_k$ of the SDMA system and includes a combining matrix $S_k$ 211 and a $U_k^H$ 213 which is a complex conjugate and transpose of a Post-Singular Value Decomposition (Post-SVD) weight $U_k$.

In FIG. 2A, in the transmission process 200 of the SDMA system, the water-filling power control weight $E_k$ 201 is provided to control power of Tx data of each user.

The Pre-SVD weight $V_k$ 203 is used to obtain a maximum channel capacity of each user. In this case, as expressed by Equation 3 below, a MIMO channel of each user is divided into independent single-input, single-output (SISO) channels by using SVD, and a gain of each SISO channel is regarded as a singular value of an effective MIMO channel $D_k$ of each user. The Pre-SVD weight $V_k$ 203 is a right singular matrix of the effective MIMO channel $D_k$.

The SDMA weight $W_k$ 205 is provided to be multiplied by a matrix of channels. In this case, the result of the multiplication is 0 when it is multiplied by channels of remaining users other than the selected user. That is, the SDMA weight $W_k$ 205 is a matrix in which channels of the remaining users are null-spaces.

Referring to FIG. 2B, in the reception process of the SDMA system, the combining matrix $S_k$ 211 is used to combine Rx signals received through a plurality of antennas into $L_k$ data streams when $N_{R,k} > L_k$. The combining matrix $S_k$ 211 is a left singular matrix of a channel matrix $H_k$ of each user.

The $U_k^H$ 213 corresponds to the Pre-SVD weight $V_k$ 203 of the transmission process $T_k$ 200 and is a left singular matrix of an effective MIMO channel.

For example, in a Zero-Forcing (ZF)-based SDMA system, transmit (Tx) data streams restored by users through the receiving units 130-1 to 130-N can be expressed by Equation 1 below:

$$\tilde{X}_{zf} = R_{zf}^H (HT_{zf} X_{zf} + N) = R_{zf}^H HT_{zf} X_{zf} + R_{zf}^H N \quad [\text{Eqn. 1}]$$
$$= U_{zf}^H SHW_{zf} V_{zf} E_{zf} X_{zf} + R_{zf}^H N$$
$$= D_{zf} E_{zf} X_{zf} + R_{zf}^H N.$$

Herein, $X_{zf}$ denotes a Tx symbol and can be expressed as $X_{zf} = [X_{zf,1}^H X_{zf,2}^H \ldots X_{zf,K}^H]^H$. A subscript 'zf' denotes that the ZF-based system is used, and subscripts $1, \ldots, K$ denote users. A superscript 'H' denotes a complex conjugation and transpose of a matrix or a vector. N denotes Additive White Gaussian Noise (AWGN) of a receiver of each user and can be expressed as: $N = [n_1^H n_2^H \ldots n_K^H]^H$. $\tilde{X}_{zf}$ denotes data symbols restored by the receiving units 130-1 to 130-N and can be expressed as: $\tilde{X}_{zf} = [\tilde{X}_{zf,1}^H \tilde{X}_{zf,2}^H \ldots \tilde{X}_{zf,K}^H]^H$. H denotes a MU-MIMO channel and can be expressed as: $H = [H_1^H H_2^H \ldots H_K^H]^H$. T denotes a weight of a transmission unit, that is, transmission process, and can be expressed as:

$T_{zf} = [T_{zf,1} T_{zf,2} \ldots T_{zf,K}] = W_{zf} V_{zf} E_{zf}$. Herein, $W_{zf}$ can be expressed as $W_{zf} = [W_{zf,1} W_{zf,2} \ldots W_{zf,K}]$ and $V_{zf} E_{zf}$ can be expressed as:

$$V_{zf} E_{zf} = \begin{bmatrix} V_{zf,1} E_{zf,1} & 0 & \cdots & 0 \\ 0 & V_{zf,2} E_{zf,2} & \ddots & \vdots \\ \vdots & \ddots & \ddots & 0 \\ 0 & \cdots & 0 & V_{zf,K} E_{zf,K} \end{bmatrix}.$$

In addition, $R_{zf}^H$ denotes a weight of a receiving unit of each user, that is, a complex conjugate and transpose of a reception process, and can be expressed as Equation 2 below.

$$R_{zf}^H = \begin{bmatrix} R_{zf,1}^H & 0 & \cdots & 0 \\ 0 & R_{zf,2}^H & \ddots & \vdots \\ \vdots & \ddots & \ddots & 0 \\ 0 & \cdots & 0 & R_{zf,K}^H \end{bmatrix} \quad [\text{Eqn. 2}]$$

$$= U_{zf}^H S = \begin{bmatrix} U_{zf,1}^H & 0 & \cdots & 0 \\ 0 & U_{zf,2}^H & \ddots & \vdots \\ \vdots & \ddots & \ddots & 0 \\ 0 & \cdots & 0 & U_{zf,K}^H \end{bmatrix} \begin{bmatrix} S_1 & 0 & \cdots & 0 \\ 0 & S_2 & \ddots & \vdots \\ \vdots & \ddots & \ddots & 0 \\ 0 & \cdots & 0 & S_K \end{bmatrix}$$

Herein, SVD weights of transmitting/receiving units are related as Equation 3 below:

$$S_k H_k W_{zf,k} \stackrel{SVD}{=} U_{zf,k} D_{zf,k} V_{zf,k}^H, \forall k. \quad [\text{Eqn. 3}]$$

Consequently, the MU-MIMO channel is divided into a SISO channel format as expressed by Equation 4 below:

$$D_{zf} = \begin{bmatrix} D_{zf,1} & 0 & \cdots & 0 \\ 0 & D_{zf,2} & \ddots & \vdots \\ \vdots & \ddots & \ddots & 0 \\ 0 & \cdots & 0 & D_{zf,K} \end{bmatrix}. \quad [\text{Eqn. 4}]$$

By using an effective channel $D_{zf,k} E_{zf,k}$ obtained by performing the aforementioned operations, an SINR or a capacity required in scheduling can be computed.

In the MU-MIMO system described with reference to FIG. 1 and FIG. 2, operations of a scheduling method for selecting active users and the number of data streams of each user are performed for the purpose of obtaining a maximum capacity. In this case, the transmitter must compute an SINR or a capacity resulted from combination of users as expressed by Equation 5 below:

$$\sum_{K=1}^{N_T} \left[ \binom{N}{K} \times (\text{number of available data streams}) \right] \quad [\text{Eqn. 5}]$$

Herein, K denotes the number of users selected through scheduling, that is, the number of active users which receive services. N denotes the number of all users. $N_T$ denotes the number of Tx antennas.

In the conventional system, scheduling is performed by using channel state information of all users. Thus, all of the users have to feed back their channel state information to the transmitter, which leads to an increase in complexity in a transmission or reception process due to an excessive amount of channel feedback information and combinations expressed by Equation 6 above. Therefore, to reduce the amount of channel feedback information of a user, the present invention provides a method in which a base station (BS) sequentially selects active users so that all users do not have to feedback channel state information, and thus scheduling is performed by receiving only selective channel feedback information (i.e., channel feedback information on scheduled users). After performing the scheduling, operations are sequentially performed in such a manner that the selective channel feedback information received by the base station (BS) is broadcast to all unscheduled users, channel state information received by the uses from the base station and partial feedback information (e.g., maximum capacity obtained by computing the channel state information of each user) are then transmitted again to the base station, and the base station is then allowed to select a next active user.

Figure 3:
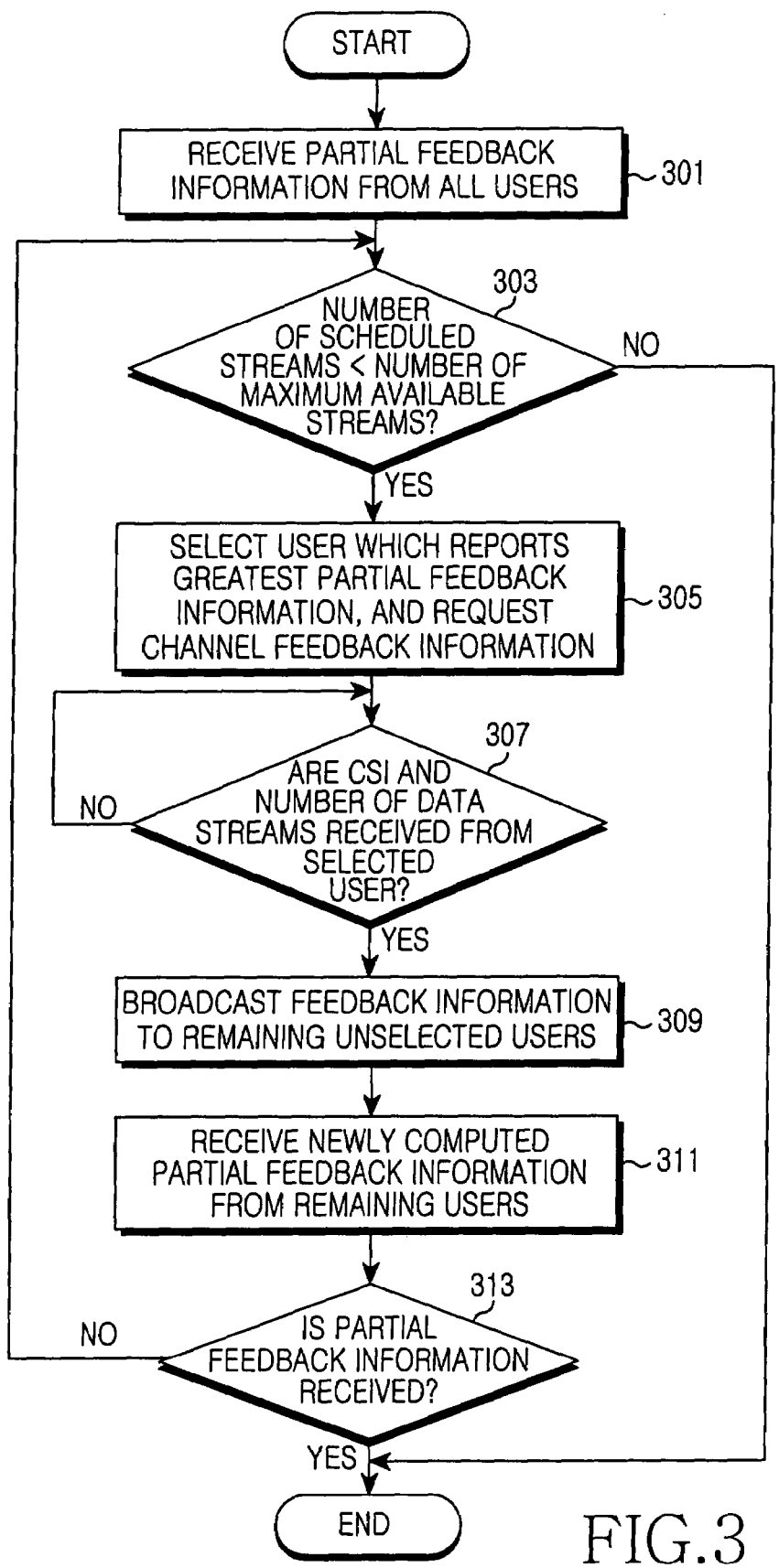
FIG. 3 is a flowchart illustrating a method of performing sequential scheduling for selecting active users and the number of data streams for each user in a base station of a MU-MIMO system according to the present invention.

FIG. 3 is a flowchart illustrating a method of performing sequential scheduling for selecting active users and the number of data streams for each user in a base station of a MU-MIMO system according to the present invention.

Referring to FIG. 3, in step 301, the base station receives partial feedback information, which is computed in an initialization process, from all users. The partial feedback information may be an SINR or a capacity Ck of each user, which can be used as a reference in scheduling.

In step 303, the base station checks whether the number of scheduled data streams is less than the number of maximum available data streams, as expressed by Equation 6 below. The number of maximum available data streams may be the number of transmit (Tx) antennas:

$$\sum_{k=1}^{K} L_k < N_T \qquad \text{[Eqn. 6]}$$

Herein, K denotes the number of users selected through scheduling, that is, the number of users which receive services. $L_k$ denotes the number of data streams of a selected user k. $N_T$ denotes the number of Tx antennas.

If the number of scheduled data streams is greater than or equal to the number of maximum available data streams, the base station determines that the scheduling is completed, and then the procedure of FIG. 3 is ended. On the other hand, if the number of scheduled data streams is less than the number of maximum available data streams, in step 305, the base station selects a user which reports the greatest feedback information value among partial feedback information values received from all users, and then requests the selected user to send channel feedback information.

In step 307, the base station checks whether entire feedback information (i.e., CSI) and the number of data streams are fed back from the selected user as the channel feedback information. Upon receiving the CSI and the number of data streams from the selected user, in step 309, the base station broadcasts the CSI and the number of data streams to remaining unselected users among all users.

In step 311, the base station receives newly computed partial feedback information from the remaining users. The newly computed partial feedback information is obtained by using channel feedback information of previously scheduled users.

In step 313, the base station checks the existence of partial feedback information received from the remaining users. If the partial feedback information received from the remaining users exists, returning back to step 303, subsequent steps are performed on the users transmitting the newly estimated partial feedback information in step 311. On the other hand, if there is no partial feedback information received from the remaining users, the BS determines that the scheduling is completed, and then the procedure of FIG. 3 is ended.

Figure 4:
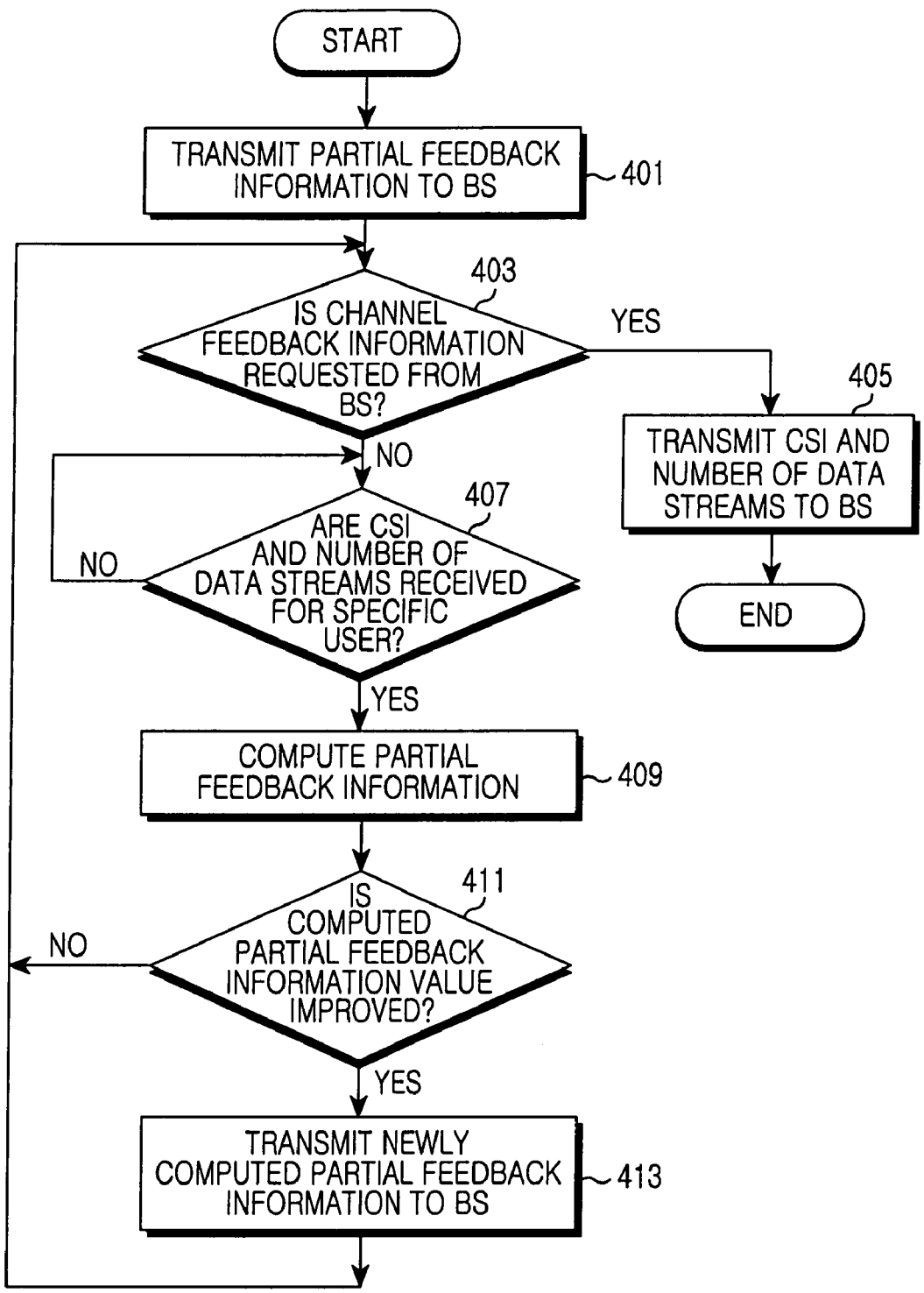
FIG. 4 is a flowchart illustrating a method of transmitting feedback information for performing sequential scheduling in a mobile station of a MU-MIMO system according to the present invention.

FIG. 4 is a flowchart illustrating a method of transmitting feedback information for performing sequential scheduling in a mobile station of a MU-MIMO system according to the present invention.

Referring to FIG. 4, in step 401, the mobile station transmits partial feedback information, which is computed in an initialization process, to a base station. The partial feedback information may be an SINR or a capacity Ck of the mobile station, which can be used as a reference in scheduling.

In step 403, the mobile station checks whether channel feedback information is requested by the basee station. Upon receiving the channel feedback information request, the mobile station determines that the mobile station itself is scheduled by the base station. Then, in step 405, the mobile station feeds back entire feedback information (i.e., CSI) and the number of data streams to the basee station as the channel feedback information of the mobile station. Then, the procedure of FIG. 4 is ended.

On the other hand, if the channel feedback information is not requested, in step 407, the MS checks whether the CSI and the number of data streams are received for a specific user from the base station. Upon receiving the CSI and the number of data streams, in step 409, the MS estimates a transmission/reception process for the case where the MS itself is selected, by the use of CSI and the number of data streams which are received from the base station not only for the specific user but also for previously scheduled users. In addition, by using the estimated transmission/reception process, the mobile station computes partial feedback information (e.g., SINR or capacity Ck) that can be used as a reference in scheduling according to the number of data streams of the mobile station.

In step 411, it is checked whether the computed partial feedback information value (e.g., SINR, capacity, etc.) has been improved in comparison with the previously computed partial feedback information value. If there is an improvement in the currently computed partial feedback information, in step 413, the mobile station transmits the computed partial feedback information to the base station. Then, in step 403, subsequent steps are repeated. On the other hand, if there is no improvement in the currently computed partial feedback information, returning back to step 403, the mobile station repeats subsequent steps.

In an operation for estimating a transmission/reception process, if a $j^{th}$ transmission process of an $i^{th}$ user is defined as $T_{i,j}$, then, when a null-space $W_{i,j}$ is computed to obtain the transmission process $T_{i,j}$ for each user, a computational complexity can be significantly reduced by using a sequential method proposed in the present invention. In comparison with the conventional null-space computation, the sequential null-space computation method proposed in the present invention for reducing a computational complexity will now be described under the following assumptions.

In a method of reducing the amount of channel feedback information proposed in the present invention, if it is assumed that capacity-based scheduling is used, all users have to compute a maximum capacity Ck as partial feedback information to be reported to a base station. In this case, a transmitter (or a receiver) has to estimate transmission/reception processes $T_{i,j}$ and $R_{i,j}$. In order to estimate a transmission process of a fifth user, the following computation is performed under the assumption described below.

It will be assumed that the number $N_T$ of Tx antennas of the base station is 8, the number $N_{R,k}$ of Rx antennas of each user is 2, the number N of all users is 16, and the number $L_k$ of data streams for each user is 2. In addition, the number of maximum available users of the system is equal to $N_T$. If a set of a previously selected user K is {1,2,3,4}, a null-space $W_{i,j}$ is computed step by step as described below and thus a capacity of an unselected user is obtained. It will be assumed herein that the unselected user is assumed to be a fifth user, and the null-space $W_{i,j}$ is computed to obtain a capacity of the fifth user.

First, a conventional computation method will be described. If a first user is selected as a first active user, the base station broadcasts channel feedback information of the first user to remaining users. Then, among the users receiving the channel feedback information, a fifth user computes a null-space by using Equation 7 below, thereby estimating a transmission process:

$$W_{1,1} = \text{null}(H_5),\ W_{5,1} = \text{null}(H_1). \quad [\text{Eqn. 7}]$$

Here, when the fifth user obtains the transmission process, computation is performed two times to obtain a 2-by-8 matrix. Accordingly, a reception process and a capacity $C_5$ are obtained, and the capacity value is fed back to the base station. The base station requests channel feedback information to a second user which has the greatest capacity among the capacity values fed back by the respective users.

Next, the base station broadcasts channel feedback information of the second user to remaining users. To estimate a transmission process for the case where the fifth user is selected from the users receiving the channel feedback information, the fifth user computes a new null-space according to Equation 8 below by using the previously received channel feedback information of the first user, channel feedback information of the second user, and channel state information and the number of data streams of the fifth user:

$$W_{1,2} = \text{null}\left(\begin{bmatrix} H_2 \\ H_5 \end{bmatrix}\right), \quad [\text{Eqn. 8}]$$

$$W_{2,2} = \text{null}\left(\begin{bmatrix} H_1 \\ H_5 \end{bmatrix}\right),$$

$$W_{5,2} = \text{null}\left(\begin{bmatrix} H_1 \\ H_2 \end{bmatrix}\right).$$

Here, when the fifth user obtains a transmission process, computation is performed three times to obtain a 4-by-8 matrix. Then, a reception process and a capacity $C_5$ are obtained, and the capacity value is fed back to the base station. In this case, the base station requests the third user, which has the greatest capacity among the capacity values fed back by the respective users, to send channel feedback information.

Here, when the fifth user obtains a transmission process, computation is performed three times to obtain a 4-by-8 matrix. Then, a reception process and a capacity C5 are obtained, and the capacity value is fed back to the base station. In this case, the base station requests the third user, which has the greatest capacity among the capacity values fed back by the respective users, to send channel feedback information.

Next, channel feedback information of the third user is broadcast to remaining users. Among users receiving the channel feedback information, the fifth user estimates a transmission process for the case where the fifth user is selected, by using channel feedback information of first to third users together with channel state information and the number of data streams of the fifth user. For this, a new null-space is computed as expressed by Equation 9 below:

$$W_{1,3} = \text{null}\left(\begin{bmatrix} H_2 \\ H_3 \\ H_5 \end{bmatrix}\right),\ W_{2,3} = \text{null}\left(\begin{bmatrix} H_1 \\ H_3 \\ H_5 \end{bmatrix}\right), \quad [\text{Eqn. 9}]$$

$$W_{3,3} = \text{null}\left(\begin{bmatrix} H_1 \\ H_2 \\ H_5 \end{bmatrix}\right),\ W_{5,3} = \text{null}\left(\begin{bmatrix} H_1 \\ H_2 \\ H_3 \end{bmatrix}\right).$$

Here, when the fifth user obtains the transmission process, computation is performed four times to obtain a 6-by-8 matrix. In such a conventional computation method, the number of flops per user is obtained by Equation 10 below:

$$\sum_{j=1}^{N_T} 6(j+1)\{4(N_j - L_{i,j})N_T^2 + 8(N_j - L_{i,j})^2 N_T + 9(N_j - L_{i,j})^3\} \quad [\text{Eqn. 10}]$$

(flops/user).

Herein, $L_j$ denotes the number of total data streams in a $j^{th}$ operation, that is, $$\sum_{i=1}^{K} L_{i,j} \cdot L_{i,j}$$

denotes the number of data streams of an $i^{th}$ user in a $j^{th}$ operation. That is, the conventional computation method has a problem in that computation becomes further complex in proportion to the number of reference channels when computing a null-space.

The sequential null-space computation method proposed in the present invention can be expressed by Equation 11 below:

$$\text{null}\left(\begin{bmatrix} A \\ B \end{bmatrix}\right) = \text{null}(B) \cdot \text{null}(A \cdot \text{null}(B)). \quad [\text{Eqn. 11}]$$

According to Equation 11, in a null-space computation process, a null-space is computed in a first operation to compute a capacity of a fifth user. As a result, as expressed in Equation 12 below, computation is performed two times to obtain a 2-by-8 matrix:

$$W_{1,1} = \text{null}(H_5),\ W_{5,1} = \text{null}(H_1). \quad [\text{Eqn. 12}]$$

In a second operation, computation is performed three times to obtain a 2-by-6 matrix as expressed by Equation 13, and this shows a decrease in a computational complexity:

$$W_{1,2} = \text{null}\left(\begin{bmatrix} H_2 \\ H_5 \end{bmatrix}\right) = W_{1,1}\text{null}(H_2 W_{1,1}) \quad \text{[Eqn. 13]}$$

$$W_{2,2} = \text{null}\left(\begin{bmatrix} H_1 \\ H_5 \end{bmatrix}\right) = W_{1,1}\text{null}(H_1 W_{1,1}),$$

$$W_{5,2} = \text{null}\left(\begin{bmatrix} H_1 \\ H_2 \end{bmatrix}\right) = W_{5,1}\text{null}(H_2 W_{5,1}).$$

Likewise, in a third operation, computation is performed four times to obtain a 2-by-4 matrix as expressed by Equation 14, and this shows a decrease in a computational complexity:

$$W_{1,3} = \text{null}\left(\begin{bmatrix} H_2 \\ H_3 \\ H_5 \end{bmatrix}\right) = W_{1,2}\text{null}(H_3 W_{1,2}), \quad \text{[Eqn. 14]}$$

$$W_{2,3} = \text{null}\left(\begin{bmatrix} H_1 \\ H_3 \\ H_5 \end{bmatrix}\right) = W_{2,2}\text{null}(H_3 W_{2,2});$$

$$W_{3,3} = \text{null}\left(\begin{bmatrix} H_1 \\ H_2 \\ H_5 \end{bmatrix}\right) = W_{2,2}\text{null}(H_2 W_{2,2}),$$

$$W_{5,3} = \text{null}\left(\begin{bmatrix} H_1 \\ H_2 \\ H_3 \end{bmatrix}\right) = W_{5,2}\text{null}(H_3 W_{5,2}).$$

The number of flops per user according to the computation method of the present invention can be obtained according to Equation 15 below:

$$\sum_{j=1}^{N_T-1} 6(j+1)\{4L_{i,j}(N_T - L_{(j-1)} + L_{i,j})^2 + \quad \text{[Eqn. 15]}$$

$$8L_{i,j}^2(N_T - L_{(j-1)} + L_{i,j}) + 9L_{i,j}^3\} +$$

$$\sum_{j=2}^{N_T-1} 6(j+1)\{N_T^2 N_R(N_T - L_{(j-1)}) + (N_T - L_{(j-1)})^2 N_T L_{i,j}\}$$

(flops/user)

As such, when a computational complexity in the conventional computation method is compared with a computational complexity in a sequential null-space computation method proposed in the present invention, it can be seen that the use of the method of the present invention can provide further reduced computational complexity. In the computation method of the present invention, the null-space computation is carried out step by step, that is, a previous null-space $W_{i,j-1}$ is used in computation of a current null-space $W_{i,j}$. Therefore, a memory is required to store values obtained in each step of the null-space computation.

The sequential null-space computation method may be used by both a transmitter and a receiver when a process operates. This method can reduce a computational complexity of the transmitter or the receiver, and can be applied to an SMDA system having a plurality of transmit (Tx) antennas.

Figure 5:
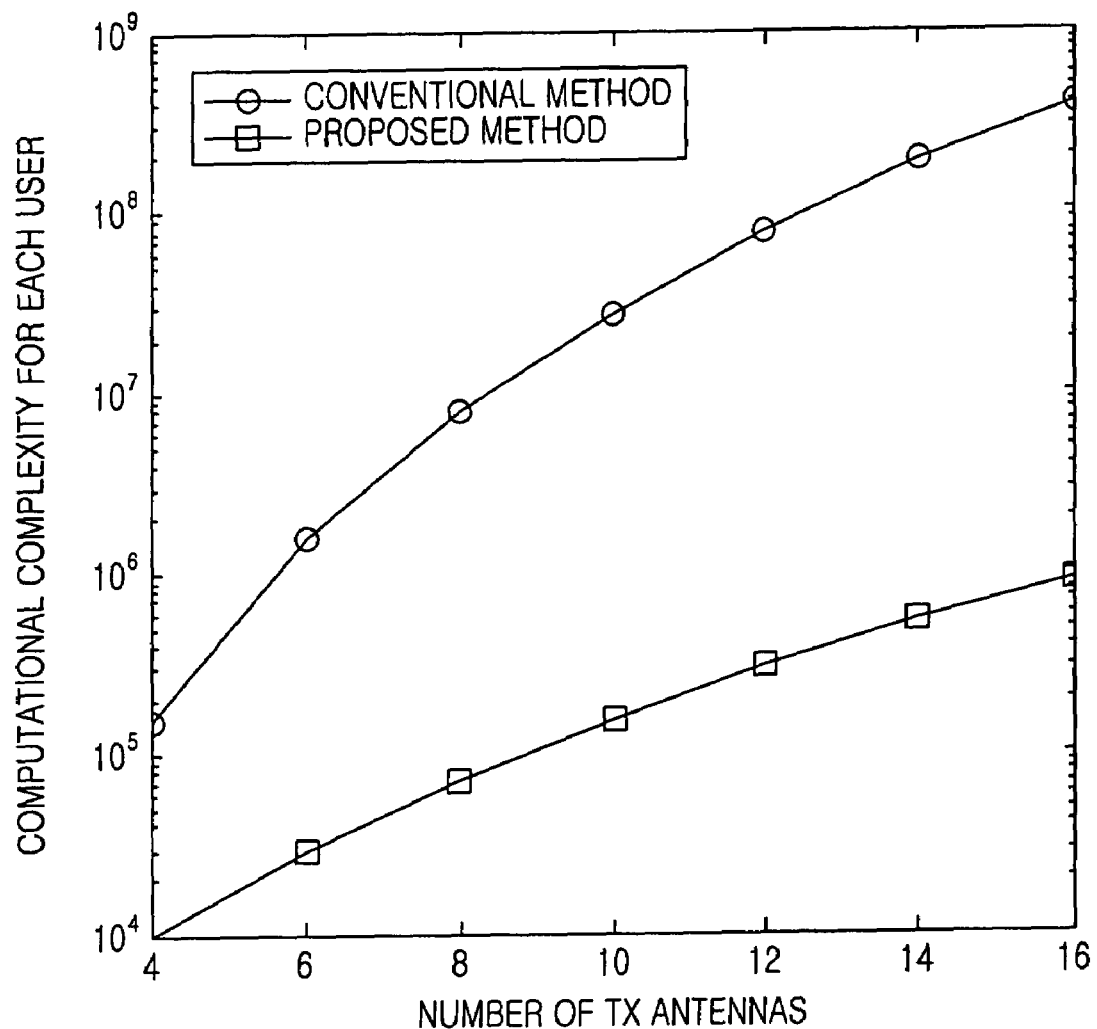
FIG. 5 and FIG. 6 are graphs illustrating a computational complexity and a decrease rate of the number of flops of the present invention in comparison with those of the prior art.
Figure 6:
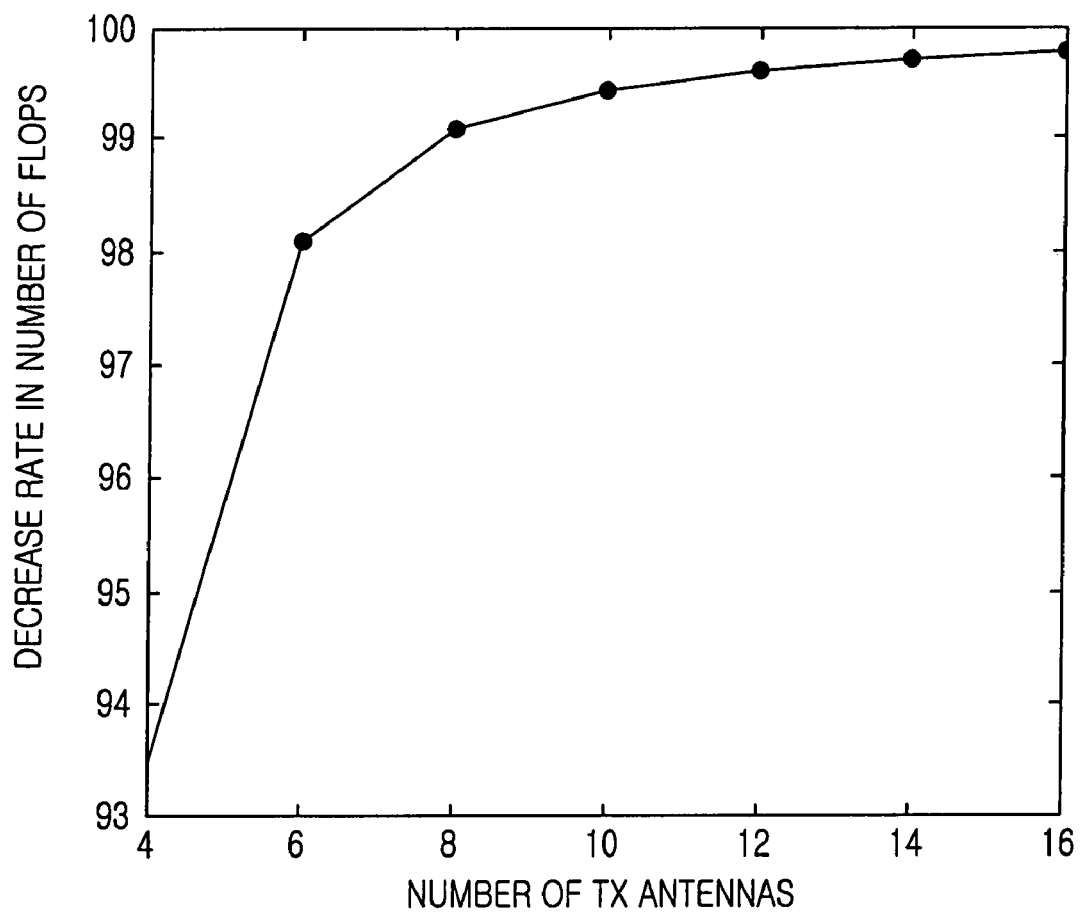

FIG. 5 and FIG. 6 are graphs illustrating a computational complexity and a decrease rate of the number of flops of the present invention in comparison with those of the prior art. In the graphs of FIG. 5 and FIG. 6, a computation method proposed in the present invention and having the number of flops expressed by Equation 15 above is compared with a conventional computation method having the number of flops expressed by Equation 10. For simplicity, the number of data streams for each user is assumed to be fixed to 2.

Referring to FIG. 5, variation in the number of flops per user is observed while increasing the number of Tx antennas from 4 to 16. As a result, in proportion to the number of Tx antennas, the number of flops is further increased when using the computation method proposed in the present invention rather than the conventional computation method.

Referring to FIG. 6, in the computation method of the present invention, when the number of Tx antennas increases up to 16, the number of flops decreases by almost 100%. Thus, the SDMA technique, which has not been easily applied to the MU-MIMO system having a plurality of Tx antennas due to a problem of computational complexity, can be further easily used when the method of the present invention is used.

Accordingly, the present invention provides a scheduling technique for minimizing the amount of channel feedback of a user and an apparatus and method for reducing a computational complexity in a transmitter or a receiver according to the scheduling technique. Therefore, a maximum capacity can be obtained by using only selective channel feedback information without having to feed back channel state information of all users. In addition, a computation complexity can be significantly reduced in a transmission/reception process.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of performing scheduling in a transmitter of a communication system, the method comprising:
   selecting a user which reports the greatest partial feedback information among a plurality of pieces of partial feedback information of all users in an initialization operation, and requesting channel feedback information from the selected user; and
   broadcasting the channel feedback information of the selected user to remaining unselected users upon receiving the channel feedback information from the selected user.

2. The method of claim 1, wherein the partial feedback information comprises one of: i) a Signal to Interference and Noise Ratio (SINR); and ii) a capacity.

3. The method of claim 1, further comprising, prior to selecting a user, receiving the partial feedback information from all users.

4. The method of claim 1, wherein the channel feedback information comprises one of: i) Channel State Information (CSI); and ii) the number of data streams.

5. The method of claim 1, further comprising
   receiving the partial feedback information from the remaining unselected users; and
   repeating the steps of selecting a user which reports the greatest partial feedback information among a plurality of pieces of the partial feedback information from the remaining unselected users, requesting channel feedback information from the selected user, and broadcasting the channel feedback information of the selected user to the remaining unselected users upon receiving the channel feedback information from the selected user, until scheduling is completed.

6. The method of claim 5, wherein the scheduling is completed when the partial feedback information is not received from the remaining unselected users or when the number of scheduled data streams is greater than or equal to the number of maximum available data streams.

7. A method of feeding back channel information in a receiver of a communication system, the method comprising:
when channel feedback information is requested by a base station, transmitting the channel feedback information to the base station; and
when channel feedback information of a previously scheduled user is received from the base station, computing partial feedback information by using channel state information of the receiver and the channel feedback information of the previously scheduled user.

8. The method of claim 7, wherein computing of partial feedback information comprises:
estimating a transmission and reception process for the case where the receiver is scheduled by using the channel state information of the receiver and the channel feedback information of the previously scheduled user; and
computing the partial feedback information according to the number of data streams of the receiver by using the estimated transmission and reception process.

9. The method of claim 8, wherein the transmission and reception process comprises at least one selected from a group consisting of a water-filling power control weight, a pre-singular value decomposition weight, a Space Division Multiple Access (SDMA) weight, a combining matrix, and a post-singular value decomposition weight.

10. The method of claim 7, wherein the channel feedback information comprises one of: i) Channel Station Information (CSI); and ii) the number of data streams.

11. The method of claim 7, wherein the partial feedback information comprises one of: i) a Signal to Interference and Noise Ratio (SINR); and ii) a capacity.

12. The method of claim 7, further comprising transmitting the computed partial feedback information to the base station.

13. The method of claim 12, wherein the computed partial feedback information is transmitted when the computed partial feedback information value is improved from a previously computed partial feedback information value.

14. An apparatus for performing scheduling in a transmitter of a communication system, the apparatus comprising:
a scheduler configured to select a user which reports the greatest partial feedback information among a plurality of pieces of partial feedback information of all users in an initialization operation and request channel feedback information from the selected user, and to broadcast the channel feedback information of the selected user to remaining unselected users upon receiving the channel feedback information from the selected user; and
a feedback receiving unit configured to output, to the scheduler, partial feedback information received from unselected users and channel feedback information received from the selected user.

15. The apparatus of claim 14, wherein the scheduler is configured to receive feedback information from the remaining users and then repeat the steps of selecting a user which reports the greatest partial feedback information among a plurality of pieces of the partial feedback information from the remaining unselected users, requesting channel feedback information from the selected user, and broadcasting the channel feedback information of the selected user to the remaining unselected users upon receiving the channel feedback information from the selected user, until no feedback information is received from the remaining users or until the number of scheduled data steams becomes greater than or equal to the number of maximum available data streams.

16. The apparatus of claim 14, wherein the partial feedback information comprises one of: i) a Signal to Interference and Noise Ratio (SINR); and ii) a capacity.

17. The apparatus of claim 14, wherein the channel feedback information comprises one of: i) Channel State Information (CSI); and ii) the number of data streams.

18. An apparatus for feeding back channel information in a receiver of a communication system, the apparatus comprising
a channel estimator configured to transmit the channel feedback information to the base station when channel feedback information is requested by a base station, and to compute partial feedback information by using channel state information of the receiver and the channel feedback information of a previously scheduled user when channel feedback information of the previously scheduled user is received from the base station.

19. The apparatus of claim 18, wherein the channel estimator is configured to estimate a transmission and reception process for the case where the receiver is scheduled by using the channel state information of the receiver and the channel feedback information of the previously scheduled user, and compute the partial feedback information according to the number of data streams of the receiver by using the estimated transmission and reception process.

20. The apparatus of claim 19, wherein the transmission and reception process at least one selected from a group consisting of a water-filling power control weight, a pre-singular value decomposition weight, a Space Division Multiple Access (SDMA) weight, a combining matrix, and a post-singular value decomposition weight.

21. The apparatus of claim 18, wherein the channel feedback information comprises one of: i) Channel Station Information (CSI); and ii) the number of data streams.

22. The apparatus of claim 18, wherein the partial feedback information comprises one of: i) a Signal to Interference and Noise Ratio (SINR); and ii) a capacity.

23. The apparatus of claim 18, wherein the channel estimator is configured to transmit the computed partial feedback information to the base station when the computed partial feedback information value is improved from a previously computed partial feedback information value.

* * * * *